2,703,818
SEPARATION OF CYCLOHEXANE FROM METH-YLCYCLOPENTANE BY CRYSTALLIZATION

Martin R. Cines, Bartlesville, Okla., assignor to Phillips Petroleum Company, a corporation of Delaware Application January 4, 1949, Serial No. 69,206

7 Claims. (Cl. 260—666)

This invention relates to the separation of hydrocarbons by crystallization. A specific aspect of the invention relates to a method of resolving certain binary hydrocarbon mixtures that form solid solutions.

It is already known to resolve mixtures of hydrocarbons or other organic compounds by fractional crystallization. In such processes, the mixture in question is cooled until crystals form and the crystals are separated from the supernatant liquid. It is customary in such processes to maintain the crystallization temperature not much lower than that required for the formation of appreciable quantities of crystals.

I have found that the above method is not universally applicable to the resolution of binary mixtures of hydrocarbons. It has recently been reported by Tooke and Aston, JACS 67-2275 (1945), that certain pairs of hydrocarbons probably form solid solutions. Hydrocarbon pairs specifically mentioned are: 2,3-dimethylbutane and 2,2-dimethylbutane; 2,3-dimethylbutane and 2-methylpentane; cyclopentane and 2,2-dimethylbutane; 1,2-butadiene and cis-butene-2; cyclohexane and methylcyclopentane; and 2,2,3-trimethylbutane and 2,4-dimethylpentane. The formation of solid solutions in such a system severely complicates the separation of pure components. I have observed that a number of hydrocarbons that enter into the formation of solid solutions exist in more than one crystal form.

The invention has several objects, viz.,

To provide a process for separating a hydrocarbon from a mixture of hydrocarbons whereby the hydrocarbon is recovered in pure form.

To provide a relatively simple process for resolving a mixture of hydrocarbons so as to obtain the hydrocarbon constituents in relatively pure form.

To provide for the separation in pure form of a hydrocarbon from a binary mixture of hydrocarbons, which hydrocarbon forms solid solution with the other hydrocarbon in the mixture.

Other objects of the invention will become apparent from the accompanying disclosure.

The following discussion will concern mainly binary mixtures consisting of cyclohexane and methylcyclopentane, although the invention in its broadest scope is not limited to these specific mixtures. The invention, in the broadest sense, applies to mixtures, one component of which can exist in more than one crystal form and can form solid solutions with at least one other component; one limitation is that one of said crystal forms, namely the lower temperature stable one, be substantially incapable of forming solid solutions with said other component. Another limitation is that the eutectic temperature is below that for the solid-phase transition of the one component.

Figure 1:
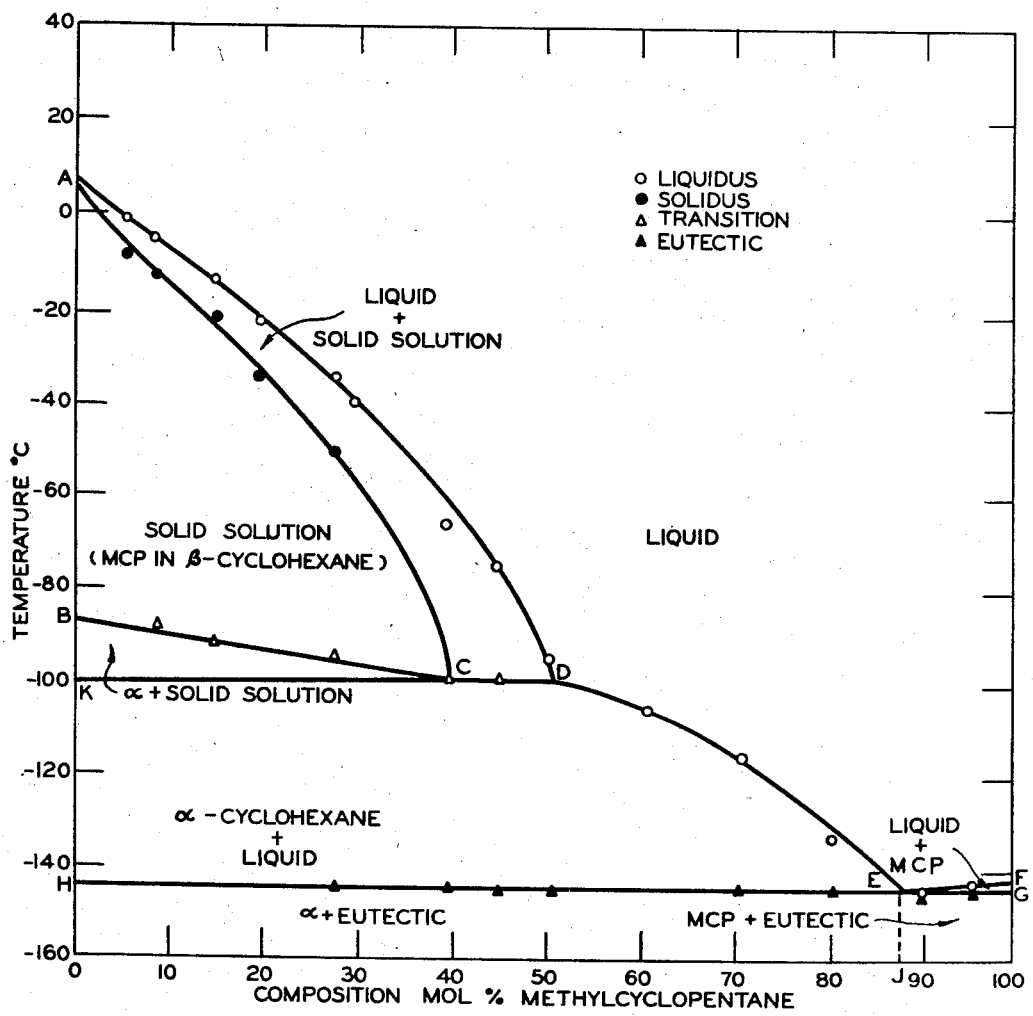
Figure 2:
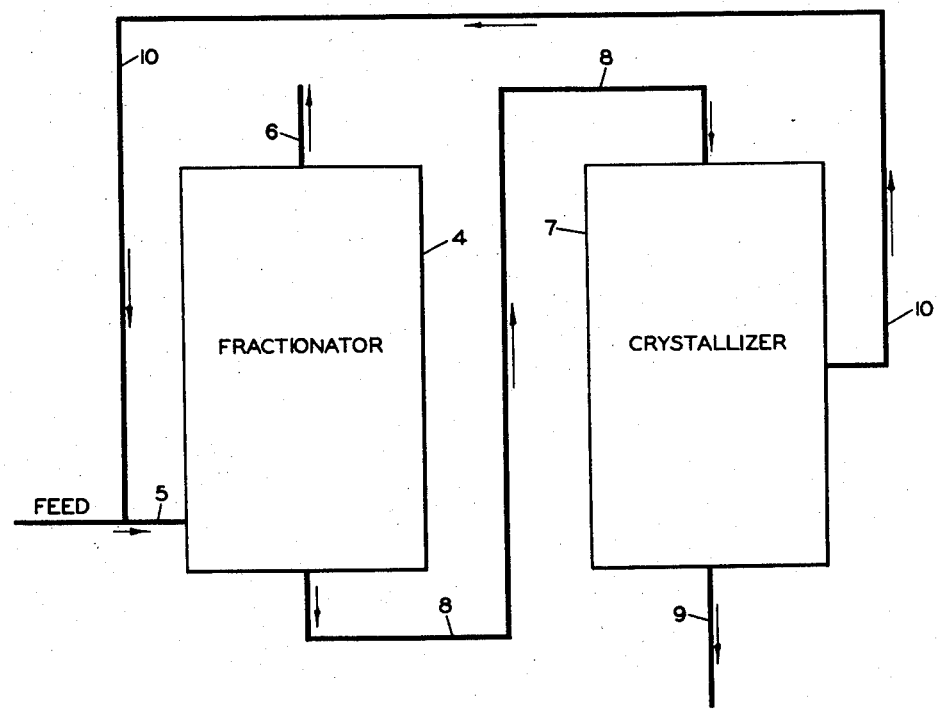

In the drawings, Figure 1 represents a phase-equilibrium diagram for the system cyclohexane-methylcyclopentane; and Figure 2 is a flow diagram for purification of hydrocarbons by crystallization according to the invention.

Referring to Figure 1, in which temperature is plotted against composition, the area above the curves ADEF represents conditions under which a single homogeneous liquid phase exists. Under conditions represented by the area ACD, liquid exists in equilibrium with a solid solution of methylcyclopentane in cyclohexane. Under conditions represented by the area ABC the system consists of a single homogeneous solid phase, which is a solution of methylcyclopentane in cyclohexane. In this solid solution, the cyclohexane exists in one crystalline form known as the beta form. Under conditions represented by the area BKC, the mixture consists of two different solid phases. One phase is the solid solution methylcyclopentane in beta cyclohexane discussed abo The other solid phase is cyclohexane in a different crys line form, known as the alpha form. Under conditi represented by the area KCDEH, a solid phase exists equilibrium with a liquid phase. The liquid phase i mixture of cyclohexane and methylcyclopentane the solid phase is alpha cyclohexane. Under conditi represented by the area EFG, liquid mixture exists equilibrium with crystals of methylcyclopentane. In area below the line HEG, eutectic (an intimate chanical mixture of alpha cyclohexane and methylcy pentane of composition given by point E) exists. this area and to the left of the line EJ, the eutectic ex in admixture with alpha cyclohexane, and on the ri in admixture with methylcyclopentane.

While the line CD is shown on the phase diagram Figure 1 as representing approximately −100° C., point at which the change from liquid plus solid solut to alpha cyclohexane plus liquid methylcyclopent takes place lies in the region between −100° C. approximately −110° C. The difficulties encounte in fixing this temperature at a specific point have b practically insurmountable. A few of the difficul involved are the effect of super-cooling, slow equilibri low temperature heat effects with attendant difficulty determining temperature in this range, etc. Howe for practical operation, cooling to a temperature −110° C. is considered necessary in order to effect desired separation of pure alpha cyclohexane from m ylcyclopentane.

It will be seen from studying this diagram that if has a mixture of 70 mol percent methylcyclopentane 30 mol percent cyclohexane and cools it to approxima −116° C., crystals of alpha cyclohexane separate can be withdrawn as purified cyclohexane. If, howe one has a mixture of 30% methylcyclopentane and 7 cyclohexane and attempts to resolve it by crystallizat crystals begin to separate at −40° C., and these crys consist of a solid solution of methylcyclopentane in l cyclohexane. One skilled in the art and not having disclosure available would probably conclude that mixture could not be directly resolved except by f tional crystallization. I have found, however, as sh in Figure 1, that if the mixture of 30% methylcyclo tane and 70% cyclohexane is cooled, not just to −40° but to −100° C. or preferably somewhat lower, nan −110° C., no solid solution exists and the crystals for at those temperatures are substantially pure alpha cy hexane. It will also be noted from the diagram, howe that the mixture should not be cooled below −144° for below this temperature the alpha cyclohexane cry will be contaminated with solid methylcyclopentane. has thus been established that, for mixtures of met cyclopentane and cyclohexane containing less than a 52 mol percent methylcyclopentane, a critical temp ture region, namely −110° to −144° C., exists, ou of which resolution into pure components cannot effected by simple fractional crystallization. The in tion will thus be seen to apply, in a specific embodin to mixtures of cyclohexane and methylcyclopentane taining less than 52 mol percent methylcyclopentane comprises a method of resolution which involves co the mixture to a temperature in the range of about − to −144° C. and recovering crystals of alpha cyclohe of high purity.

Cyclohexane at atmospheric pressure boils at app mately 81° C. Methylcyclopentane at the same pres boils at approximately 72° C. It is therefore ob that a separation by fractional distillation can be m However, when it is desirable to recover either of two components in a high degree of purity, i. e., a 97%, rather expensive and complicated fractional d lation will be necessary. The present invention, how provides a method of obtaining cyclohexane in a high degree of purity in a relatively small numbe steps and with relatively simple apparatus.

Referring to Figure 1 again, with a mixture of c hexane and methylcyclopentane containing more mol percent methylcyclopentane, it is feasible to obtain pure methylcyclopentane crystals by cooling the system to a temperature included in the area EFG. It will be noted, however, that this area represents a very small temperature range, above which no crystals would be formed and below which the methylcyclopentane crystals would be contaminated with alpha cyclohexane crystals. Such a method therefore requires extremely close temperature control, which is rather difficult at such low temperatures. The process of my invention obviates this difficulty by providing an initial or preliminary fractional distillation step in which a large proportion of the methylcyclopentane is removed as an overhead product. The kettle product from this fractional distillation is concentrated with respect to cyclohexane, which can be removed in a highly purified form by crystallization in which extremely precise temperature control is unnecessary. In such a process, it is desirable to concentrate the kettle product at least to such a point that it contains not more than 88 mol percent, more desirably not more than about 80–85%, and if desired, still more than 52 mol percent methylcyclopentane. A desirable lower limit of methylcyclopentane in the mixture is about 10%. A mixture containing less than about 10 mol percent of methylcyclopentane may be subjected to crystallization in accordance with this invention, and crystals of alpha cyclohexane of high purity may be directly recovered.

A process of this type is shown diagrammatically in Figure 2. A fraction consisting of methylcyclopentane and cyclohexane is passed to column 4 through feed line 5, and an appreciable proportion of the methylcyclopentane is removed overhead through outlet 6 and recovered as one product of the process or subjected to further purification as desired. The kettle product containing, for example 20 mol percent methylcyclopentane, is passed to crystallizer 7 through line 8. In crystallizer 7, the mixture is cooled to a temperature in the range of −110° to −144° C., and highly purified crystals of alpha cyclohexane are recovered and withdrawn through outlet 9 as the main product of the process. The supernatant liquid or mother liquor which comprises a mixture of methylcyclopentane and cyclohexane, now appreciably concentrated with respect to methylcyclopentane, is recycled to fractionator 4 through conduit 10.

Fractionator 4 may be a conventional fractional distillation system, the main column of which need not have exceptionally great height or number of theoretical plates. Crystallizer 7 will comprise conventional crystallizing, refrigerating and crystal-separating means well known in the art.

*Example*

A mixture of cyclohexane and methylcyclopentane, in approximately equal molar proportions, is subjected to fractional distillation, and an overhead fraction of substantially pure methylcyclopentane is recovered. The kettle product consists of 20 mol percent methylcyclopentane and 80% cyclohexane. This preliminary fractionation reduces materially the volume of mixture subjected to crystallization and thus achieves a substantial reduction in refrigeration costs. The 20% methylcyclopentane-80% cyclohexane mixture is passed to a crystallizer and cooled to −110° C., at which temperature crystals of alpha cyclohexane form. The supernatant liquid in equilibrium with these crystals at this temperature comprises 65 mol percent methylcyclopentane and 35 mol percent cyclohexane. The crystals are separated from the mother liquor in a centrifuge at a constant temperature of −110° C., and the liquid is recycled to the preliminary fractional distillation step. The alpha cyclohexane crystals recovered have a purity substantially greater than 99%, which is considerably higher than is attainable by simple fractional distillation in a 50-plate commercial column. If desired further purification of the crystals can be obtained by melting and repeating fractional crystallization in accordance with this invention.

It is evident from examination of Figure 1 that, in the resolution of a mixture of methylcyclopentane and cyclohexane containing less than 52 mol percent of the former, solid solution formation can be obviated by adding sufficient methylcyclopentane to increase the content of this hydrocarbon to above 52 mol percent and then subjecting the mixture to crystallization. Such an operation is within the scope of this invention, but may not be preferred, since the resultant mixture, concentrated with respect to methylcyclopentane, must still be cooled to temperatures below −110° C. to effect crystallization, and the volume of material subjected to this cooling will be increased.

Certain modifications of the invention will become apparent to those skilled in the art and the illustrative details disclosed are not to be construed as imposing unnecessary limitations on the invention.

I claim:

1. A process for separating cyclohexane from a mixture consisting essentially of methylcyclopentane and cyclohexane, which comprises concentrating said mixture to a major molar proportion of cyclohexane, cooling the resulting mixture to a temperature below −110° C. but above −144° C. so as to form α cyclohexane crystals of higher than 99% purity and recovering said crystals from the mother liquor as a product of the process.

2. The process of claim 1 including the additional steps of concentrating the mother liquor with respect to cyclohexane and repeating the cooling step so as to crystallize and recover additional cyclohexane.

3. A process for separating cyclohexane from a mixture consisting essentially of cyclohexane and methylcyclopentane in which the cyclohexane amounts to between 48 and 90 mol per cent of the mixture, which comprises cooling the mixture to a temperature in the range of −110° to −144° C. so as to form α cyclohexane crystals and recovering said crystals as a product of the process.

4. A process for separating cyclohexane from a mixture consisting essentially of methylcyclopentane and cyclohexane containing a major molar proportion of methylcyclopentane, which comprises concentrating said mixture to between 48 and 90 mol percent cyclohexane by fractional distillation, recovering an overhead fraction consisting essentially of methylcyclopentane, passing a kettle product containing between 48 and 90 mol percent cyclohexane as a feed to a crystallization zone, cooling said feed to a temperature below −110° C. but above −144° C. so as to form crystalline α cyclohexane, recovering the crystalline α cyclohexane as a product of the process, and recycling mother liquor from the crystallization zone to the distillation step so as to increase the cyclohexane concentration thereof to more than 50 mol percent.

5. A process for separating cyclohexane from a mixture consisting essentially of methylcyclopentane and cyclohexane in which the methylcyclopentane amounts to less than 52 mol percent of the mixture, which comprises increasing the concentration of methylcyclopentane in said mixture to more than 52 mol percent, thereafter cooling the resulting mixture to a temperature in the range of −110° to −144° C. so as to form α cyclohexane crystals, and recovering said crystals from the mother liquor.

6. A process for separating cyclohexane from a mixture consisting essentially of methylcyclopentane and cyclohexane containing more than 88 mol percent methylcyclopentane which comprises concentrating said mixture to between 15 and 90 mol percent cyclohexane by fractional distillation, cooling the resulting concentrated mixture to a temperature below −110° C. but above −144° C. so as to form crystalline α cyclohexane and recovering the crystalline α cyclohexane as a product of the process.

7. A process for separating cyclohexane from a mixture consisting essentially of methylcyclopentane and cyclohexane containing more than 88 mol percent methylcyclopentane which comprises concentrating said mixture to between 48 and 90 mol percent cyclohexane by fractional distillation, cooling the resulting concentrated mixture to a temperature below −110° C. but above −144° C. so as to form crystalline α cyclohexane and recovering the crystalline α cyclohexane as a product of the process.

References Cited in the file of this patent

Taylor: Treatise on Physical Chemistry, vol. 1, pub. by D. Van Nostrand, N. Y. (1925), pages 432–4.

Bruun et al.: Bureau of Standards, Jour. Res., vol. 7, pages 607–12 (1931).

Smittenberg et al.: Journal Am. Chem. Soc., vol. 60, pages 17–22 (1938).

Tooke et al.: Jour. Am. Chem. Soc., vol. 67, pages 2275–6 (1945).